United States Patent
Wei et al.

(10) Patent No.: US 12,047,280 B1
(45) Date of Patent: Jul. 23, 2024

(54) MANAGEMENT NETWORK AND METHOD OF OPERATION

(71) Applicant: AVIATRIX SYSTEMS, INC., Santa Clara, CA (US)

(72) Inventors: Xiaobo Sherry Wei, Palo Alto, CA (US); Praveen Vannarath, Sunnyvale, CA (US); Steve Zheng, Pleasanton, CA (US); Cheng Hsiang, Newark, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 17/396,630

(22) Filed: Aug. 6, 2021

Related U.S. Application Data

(60) Provisional application No. 63/133,102, filed on Dec. 31, 2020.

(51) Int. Cl.
| | |
|---|---|
| *H04L 12/66* | (2006.01) |
| *H04L 45/02* | (2022.01) |
| *H04L 45/302* | (2022.01) |
| *H04L 61/5007* | (2022.01) |

(52) U.S. Cl.
CPC ........ *H04L 45/3065* (2013.01); *H04L 45/026* (2013.01); *H04L 61/5007* (2022.05)

(58) Field of Classification Search
CPC H04L 45/3065; H04L 61/5007; H04L 45/026
See application file for complete search history.

(56) References Cited

U.S. PATENT DOCUMENTS

| | | | |
|---|---|---|---|
| 9,813,379 B1 | 11/2017 | Shevade et al. | |
| 9,942,787 B1* | 4/2018 | Tillotson | H04W 24/08 |
| 10,708,125 B1* | 7/2020 | Chen | H04L 65/1046 |
| 2002/0016926 A1* | 2/2002 | Nguyen | H04L 43/00 |
| | | | 709/220 |
| 2016/0094398 A1* | 3/2016 | Choudhury | H04L 45/42 |
| | | | 370/254 |
| 2017/0034050 A1* | 2/2017 | Sunavala | H04L 45/586 |
| 2018/0309213 A1* | 10/2018 | Harmon, III | H01R 12/716 |
| 2020/0177629 A1* | 6/2020 | Hooda | H04L 47/125 |
| 2020/0235990 A1 | 7/2020 | Janakiraman et al. | |

(Continued)

OTHER PUBLICATIONS

PCT/US2021/065548 filed Dec. 29, 2021 International Search Report and Written Opinion dated Mar. 24, 2022.

*Primary Examiner* — Christopher B Robinson
(74) *Attorney, Agent, or Firm* — Winstead PC

(57) ABSTRACT

A computerized method for utilizing private Internet Protocol (IP) addressing for communications between components of one or more public cloud networks. The method features determining whether outbound traffic corresponds to a first type of outbound traffic being forwarded from a cloud instance supported by the gateway. In response to determining that the first type of outbound traffic is being forwarded from the cloud instance, the first type of outbound traffic is directed via a data interface of the gateway. Also, the method features determining whether the outbound traffic corresponds to a second type of outbound traffic being initiated by logic within the gateway. In response to determining that the second type of outbound traffic is being initiated by logic within the gateway, directing the second type of outbound traffic via a management interface of the gateway.

22 Claims, 7 Drawing Sheets

(56) References Cited

U.S. PATENT DOCUMENTS

| | | | |
|---|---|---|---|
| 2020/0252234 A1* | 8/2020 | Ramamoorthi | H04L 45/22 |
| 2020/0382345 A1* | 12/2020 | Zhao | H04L 45/04 |
| 2020/0382471 A1 | 12/2020 | Janakiraman et al. | |

* cited by examiner

MANAGEMENT NETWORK AND METHOD OF OPERATION

CROSS-REFERENCE TO RELATED APPLICATIONS

This application claims the benefit of priority on U.S. Provisional Patent Application No. 63/133,102 filed Dec. 31, 2020, the entire contents of which are incorporated herein by reference.

FIELD

Embodiments of the disclosure relate to the field of networking. More specifically, one embodiment of the disclosure relates to a management network architecture that supports communications between network devices through the use of private IP addresses.

GENERAL BACKGROUND

Over the past few years, cloud computing has provided Infrastructure as a Service (IaaS), namely a cloud-based architecture in which resources are provided as part of a public cloud network and made accessible to tenants as a service. One of these services allows tenants to run software components (e.g., virtual machines instances such as virtual servers) residing within the public cloud network. Hence, this migration of software functionality has resulted in an increased usage of virtual private cloud networks (VPCs), namely on-demand, configurable pools of shared resources that are allocated within the cloud computing platform and provide a certain level of isolation between the different organizations or other entities (hereinafter, "users") using the resources. However, this increased usage of public cloud network resources has led to a greater need for cloud network management.

Recently, some software platforms have been developed and deployed with an ability to monitor and manage multi-cloud networking, independent of selected public cloud provider or providers. Some of these software platforms deliver automated, operational visibility of cloud resources. For example, one software platform features a controller and a group of gateways, both deployed in one or more public cloud networks. For this software platform, the controller and gateways manage their communications based on an exchange of messages over a management network, where the management messages may include gateway keep alive messages, tunnel status messages, and configuration change messages. This management network, sometimes referred to as Out-of-Band (OOB) network, is necessary for a distributed system where the controller and gateways may be deployed in different regions or even different public cloud networks.

Currently, conventional OOB networks are deployed as part of a public addressable network (Internet), such that both the controller and gateways are assigned a public Internet Protocol (IP) address and communicate with each other over the Internet. However, this type of OOB network suffers from a number of disadvantages when utilized for management of cloud resources. For instance, in compliance with agreed-upon rules of operation, network resources deployed as part of an on-premises network, when in operation, typically default to communicate over private IP addresses. However, as on-premises networks migrate toward cloud deployments, many of these cloud-based resources, when in operation, communicate over public IP addresses, and therefore, the cloud-based virtual private networks are non-compliant with pre-established rules of operation. As a result, customers are now requiring OOB networks to support communications utilizing private IP addressing for rule compliance as well as for security concerns as networks with resources (e.g., controller and/or gateway) accessible over a public IP address are more susceptible to a cyberattack (e.g., denial-of-service "DOS" attack, etc.).

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
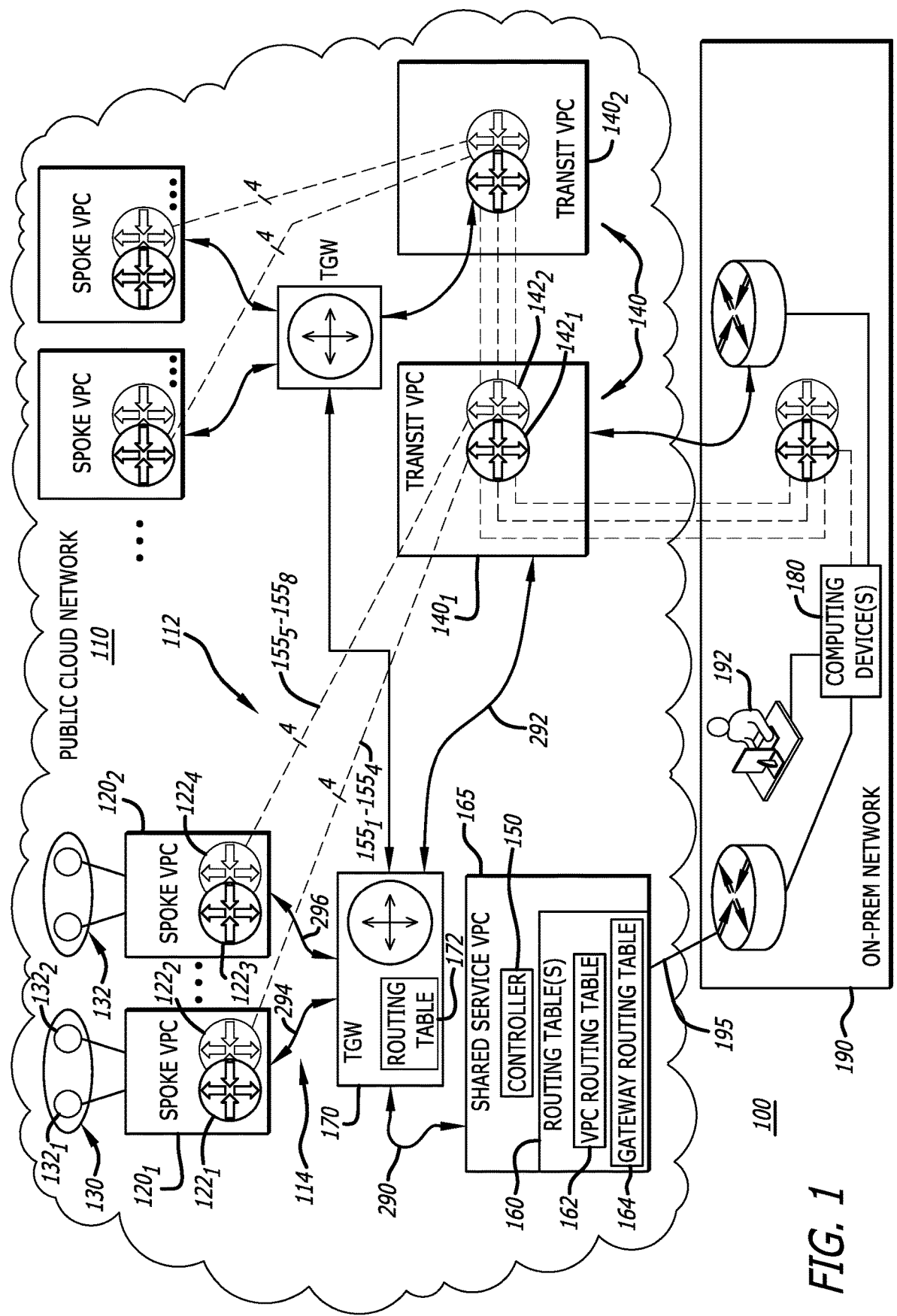
FIG. 1 is a first exemplary embodiment of a public cloud computing platform including a management network.

Embodiments of a system and method for establishing a management network within a public cloud network is shown, where the management network supports the exchange of management information through a private Internet Protocol (IP) addressing instead of public routable IP addressing. Herein, one embodiment of the disclosure features a network architecture that leverages a cloud provider's native network construct to support operability of a private management network. More specifically, in Amazon® Web Services (AWS) public cloud network for example, an AWS Transit Gateway is used to support communications between network resources, such as between a controller and one or more gateways or between at least two gateways. Alternatively, in a Microsoft® Azure® public cloud network for example, an Azure® native transit gateway may be used as a "hub" for the private management network (i.e., a device for distribution of management information throughout the management network). Both of these public cloud network deployments are described below.

In particular, according to one embodiment of the disclosure, the native cloud gateway (e.g., AWS Transit Gateway, Azure® native transit gateway, etc.) may be configured to support communications with "spoke gateways," namely gateways deployed as an edge device of a virtual private cloud network featuring these gateways (hereinafter, "spoke VPC"). Based on this network architecture, the spoke gateways are communicatively coupled to a controller via the native cloud gateway, and thus, both the spoke gateways and the controller are configured to transmit management information to each other via the native cloud gateway. Herein, the native cloud gateway may be configured to support private IP-based communications between different spoke gateways and the controller may be configured to allow for the transmission of management information from the controller to a particular spoke gateway and/or one or more instances (e.g., cloud instances associated with a particular subnet or particular subnets) in communication with that spoke gateway. Examples of the management information may include, but is not limited or restricted to gateway keep alive messages, tunnel status messages, and/or configuration change messages.

Additionally, or in the alternative, some of the gateways in communications with a native cloud gateway may include "transit gateways," namely gateways deployed within a transit VPC. According to one embodiment of the disclosure, a transit gateway may be communicatively coupled to a corresponding spoke gateway in order to provide a data path between network devices operating within an on-premises network and the one or more cloud instances in communication with one of the plurality of spoke gateways. Additionally, each of the transit gateways, along with the spoke gateways, may be accessed in accordance with a unique Classless Inter-Domain Routing (CIDR) private IP address to propagate messages over the management network.

According to another embodiment of the disclosure, in a multi-cloud environment, gateways deployed in different public cloud networks may be configured with private network connectivity to the controller. This may be accomplished via communications over the on-premises network (hereinafter, "on-prem network"). For example, VPC connectivity may be accomplished via a private circuit or public Internet; however, VPCs associated with different public cloud networks are interconnected with the controller via on-prem network to allow for a private IP addressing scheme.

I. Terminology

In the following description, certain terminology is used to describe features of the invention. In certain situations, the terms "logic" or "component" are representative of hardware, software or a combination thereof, which is configured to perform one or more functions. As hardware, the logic (or component) may include circuitry having data processing or storage functionality. Examples of such circuitry may include, but are not limited or restricted to a processor such as a microprocessor, one or more processor cores, a programmable gate array, a microcontroller, an application specific integrated circuit, wireless receiver, transmitter and/or transceiver, or combinatorial logic.

Alternatively, or in combination with the hardware circuitry described above, the logic (or component) may be software in the form of one or more software modules, which may be configured to operate as its counterpart circuitry. For instance, a software module may be a software instance that operates as a processor, namely a virtual processor whose underlying operations is based on a physical processor such as an EC2 instance within the Amazon® AWS infrastructure for example. Additionally, a software module may include an executable application, a daemon application, an application programming interface (API), a subroutine, a function, a procedure, an applet, a servlet, a routine, source code, a shared library/dynamic load library, or even one or more instructions.

The software module(s) may be a software instance stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic (or component) may operate as firmware stored in persistent storage.

The term "gateway" may be construed as virtual or physical logic. For instance, as an illustrative example, the gateway may correspond to virtual logic in the form of a software component, such as a routing component that is assigned a Private IP address within a private IP address range associated with a virtual private cloud network (VPC) including the gateway. This software component is operable in combination with underlying operations of a processor (e.g., accesses to content within data stores such as outing tables or other information processing activities) and maintained within a non-transitory storage medium. The gateway allows Cloud Service Providers (CSPs) and enterprises to enable datacenter and cloud network traffic routing between virtual and physical networks. Alternatively, in some embodiments, the gateway may correspond to physical logic, such as an electronic device that is communicatively coupled to the network and assigned an IP address.

Hence, multiple gateways may be deployed in a VPC and these gateways may be configured to control the flow of traffic from software instances of the VPC to one or more remote sites, which may be configured to process data received from the software instances. Having similar architectures, the gateways may be identified differently based on their location/operability within a public cloud network platform. The "spoke" gateways are configured to interact with cloud software instances while "transit" gateways are configured to further assist in the propagation of data traffic (e.g., one or more messages) directed to a spoke gateway within a spoke VPC or a computing device within an on-premises network.

Additionally, the term "transit VPC" may refer to a VPC that is configured, in accordance with one embodiment, to connect multiple VPCs, where the VPCs may be logically isolated and/or virtually located on data centers that may be geographically disparate. A transit VPC serves as a global network transit center that operates as a connection point for spoke VPC-to-spoke VPC communications (e.g., propagation of network traffic having a source IP address in a first spoke VPC and a destination IP address in a second spoke VPC) or spoke VPC-to-data center communications (e.g., propagation of network traffic having a source IP address in a first spoke VPC and a destination IP address at a data center). Additionally, a transit VPC may also route network traffic to other transit VPCs (e.g., propagation of network traffic having a source IP address in a first spoke VPC connected to a first transit VPC and a destination IP address in a second spoke VPC connected to a second transit VPC), which may then continue propagation of the network traffic.

Furthermore, the term "instance subnet" may refer to a subnetwork of cloud software instances, which are associated with a spoke VPC. Herein, information from or directed to certain software cloud instances forming a particular instance subnet are forwarded to a selected spoke gateway. A "VPC routing table" is a collection of data that is used to associate spoke gateways within each VPC with one or more different instance subnets.

An "Internet Protocol Security (IPSec) tunnel" constitutes a secure peer-to-peer communication link established between gateways of neighboring VPCs or between gateways of a VPC and a router of an on-premises network. The peer-to-peer communication links are secured through a secure network protocol suite referred to as "Internet Protocol Security" (IPSec). With respect to the full-mesh network deployment, where a spoke VPC has "M" gateways and a neighboring (transit) VPC has "N" gateways, M×N IPSec tunnels are created between the spoke VPC and the transit VPC to form the full-mesh network. These IPSec tunnels may be represented in gateways by virtual tunnel interfaces (VTIs) and the tunnel states may be represented by VTI states.

The term "computerized" generally represents that any corresponding operations are conducted by hardware in combination with software. The term "message" generally refers to information in a prescribed format and transmitted in accordance with a suitable delivery protocol. Hence, each message may be in the form of one or more packets, frames, or any other series of bits having the prescribed format.

The term "communication link" may be construed as a physical or logical communication path between virtual or physical logic. For example, as a physical communication path, wired and/or wireless interconnects in the form of electrical wiring, optical fiber, cable, bus trace, or a wireless channel using infrared, radio frequency (RF), may be used. This logical communication path may be established to support the transmission of one or more messages between components and is formed based on an exchange of messages.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture—First Embodiment

Referring to FIG. 1, a first exemplary embodiment of a public cloud computing platform 100 is shown. Herein, the public cloud computing platform 100 features a public cloud network 110, which includes a data network 112 and a management network 114. In general, represented by dashed lines communication links, the data network 112 is configured to support data communications between one or more virtual private cloud networks (VPCs) $120_1$-$120_N$ (N≥1) and an on-premises (on-prem) network 190. The management network 114 is configured to support an exchange of management information between components deployed throughout the cloud network 110. It is noted that aspects of the public cloud computing platform 100, such as VPCs for example, are logical representations of software being executed and providing the public cloud network 110 with additional functionality.

In particular, according to this embodiment of the disclosure, the data network 112 is configured to enable data transmissions between any cloud instance 132 supported by one of the VPCs $120_1$-$120_N$ (e.g., VPC $120_1$) and one or more computing devices 180 deployed within the on-prem network 190. These data transmissions are accomplished by routing data messages through at least a first virtual private cloud network (hereinafter, "spoke VPC") $120_1$ and a second virtual public cloud network (hereinafter, "transit VPC") 140 within the public cloud computing platform 100. As shown, multiple (i.e., two or more) spoke VPCs $120_1$-$120_2$ and one or more transit VPCs 140 are illustrated in FIG. 1, although it is contemplated that multiple transit VPCs may be deployed with a first transit VPC $140_1$ configured to support multiple spoke VPCs deployed within a first geographic region (e.g., spoke VPCs $120_1$-$120_2$) while another transit VPC $140_2$ may be configured to support different spoke VPCs in a second geographic region that differs from the first geographic region.

As shown, the spoke VPC $120_1$ is configured to support communications with one or more instance subnets 130. Each of these instance subnets includes one or more cloud instances, where each instance subnet is communicatively coupled to exchange data traffic with a selected gateway of a set of (e.g., two or more) gateways maintained in a particular spoke VPC. As an illustrative example, each instance subnet 130, including cloud instances $132_1$-$132_2$, is communicatively coupled to exchange data traffic with a selected gateway $122_1$ of a set of gateways $122_1$-$122_2$ maintained in the spoke VPC $120_1$. Herein, these gateways $122_1$-$122_2$ are referred to as "spoke gateways" $122_1$-$122_2$.

As further shown in FIG. 1, a controller 150 is configured as a component of the cloud network 110 to collect information from different components within the cloud network 110 and to generate routing tables 160 that establish and maintain information pertaining to communication links associated with these components. According to one embodiment of the disclosure, as shown, the controller 150 may be configured to generate and populate VPC routing tables 162 associated with the VPCs deployed within the cloud network 110.

For instance, as an illustrative example, the controller 150 may be configured to generate and populate VPC routing tables 162 for each of the spoke gateways $122_1$-$122_4$ within the spoke VPCs $120_1$-$120_2$ supported by the controller 150. Herein, each of these VPC routing tables 162 includes routing information associated with its respective spoke gateway $122_1$ . . . or $122_4$ as well as routing information associated with communication links between a certain spoke gateway $122_1$ . . . or $122_4$ and any cloud instances 132 associated with a particular instance subnet supported by that spoke gateway $122_1$ . . . or $122_4$. This routing information may include, but is not limited or restricted to private IP addresses associated with the spoke gateway $122_1$-$122_4$ and/or the cloud instances in communication with the spoke gateways $122_1$-$122_4$.

Additionally, other VPC routing tables 162 may be configured to include routing information associated with each of the gateways $142_1$-$142_2$ deployed within any transit VPC (e.g., transit VPC $140_1$) supported by the controller 150. Herein, these gateways $142_1$-$142_2$ may be referred to as "transit gateways" $142_1$-$142_2$. This routing information pertaining to VPC routing tables 162 associated with the transit gateways $142_1$-$142_2$ may include, but is not limited or restricted to private IP addresses associated with the transit gateways $142_1$-$142_2$.

Besides the VPC routing tables 162, the controller 150 may be adapted to configure gateway routing tables 164 for each of the gateways within the VPCs of the cloud network 110 for data transfers. More specifically, according to one embodiment of the disclosure, the controller 150 may be configured to initially program gateway routing tables 164 for both spoke gateways $122_1$-$122_4$ residing within the spoke VPC(s) $120_1$-$120_2$ and transit gateways $142_1$-$142_2$ residing within the transit VPC 140. The gateway routing tables 164 are relied upon by the gateways 122/142 for determining which tunnels to use for propagating data traffic (e.g., messages) towards a destination (e.g., virtual tunnel interface for a destination cloud instance or computing device 180 within the on-prem network 190). For this embodiment of the disclosure, the gateway routing tables 164 includes information associated with IPSec tunnels and secondary (e.g., Generic Routing Encapsulation "GRE") tunnels between gateways within the same VPC to be used in the event that all of the IPSec tunnels have failed.

In summary, the routing tables 160 are programmed to support communication links between different sources and destinations, such as an on-prem computing devices 180 and the cloud instance 132 within a particular instance subnet, or the like.

Herein, the controller 150 is communicatively coupled to the on-prem network 190 via a communication link 195 such as an Internet Protocol Security (IPSec) tunnel. Given that the controller 150 is to deploy using its private IP address, the Internet Protocol Security (IPSec) tunnel 195 allows a network administrator 192 associated with the on-prem network 190 to gain access to the controller 150 via a computing device 180 and control/manage/monitor operability of the cloud network 110.

Referring still to FIG. 1, as described above, the architecture for the data network 112 may be based, at least in part, on the peering between the set of spoke gateways $122_1$-$122_P$ (P≥2) deployed within the spoke VPC $120_1$ and the set of transit gateways $142_1$-$142_R$ (R≥2) deployed within the transit VPC 140. For ease of illustration, in FIG. 1, the set of spoke gateways $122_1$-$122_P$ is represented as a first spoke gateway $122_1$ and a second spoke gateway $122_2$, although three or more spoke gateways may be deployed within the spoke VPC $120_1$. Similarly, the set of transit gateways $142_1$-$142_R$ is represented by a first transit gateway $142_1$ and a second transit gateway $142_2$, although three or more transit gateways may be deployed within the transit VPC 140.

As further shown in FIG. 1, each of the spoke gateways $122_1$-$122_2$ are configured for transmission of data traffic with transit gateways $142_1$-$142_2$ via peer-to-peer communication links 155. In particular, as shown, each spoke gateway $122_1$, $122_2$ is communicatively coupled to at least transit gateways $142_1$, $142_2$ via four active peer-to-peer communication links $155_1$-$155_4$. The peer-to-peer communication links $155_1$-$155_4$ may constitute cryptographically secure tunnels, such as tunnels operating in accordance with a secure network protocol. One example of a secure network protocol may include, but is not limited or restricted to Internet Protocol Security (IPSec). Hence, the VPC-to-VPC tunnels may be referred to as "IPSec tunnels."

As further shown in FIG. 1, the management network 114 is based, at least in part, on usage of a native cloud gateway 170 (e.g., AWS Transit Gateway "TGW" as shown, Azure® native transit gateway, etc.), which is configured to support communications with the spoke VPCs $120_1$-$120_2$ and at least one transit VPC 140 within a prescribed region. Based on this management network architecture, the spoke VPCs $120_1$-$120_2$ are communicatively coupled to the controller 150 via the native cloud gateway 170, and thus, both the spoke VPCs $120_1$-$120_2$ and the controller 150 are configured to route management information addressed with private IP addresses to each other via the native cloud gateway 170. Similarly, the management network 114 may be configured to support the transmission of management information from the controller 150 to one or more cloud instances 132 (e.g., cloud instances $132_1$-$132_2$ associated with instance subnet 130) in communication with one of the spoke gateways (e.g., spoke gateway $122_1$).

Stated differently, operating as part of the management network 114, the native cloud gateway 170 may operate in accordance with a hub-and-spoke deployment to maintain communications of management information between one or more spoke VPCs (e.g., spoke VPCs $120_1$-$120_2$), one or more transit VPCs (e.g., transit VPC 140), and a shared service VPC 165 including the controller 150. As shown, in accordance with one embodiment of the disclosure, the native cloud gateway 170 may be configured to generate one or more routing tables 172 based on private IP addresses for components of the cloud network 110, namely the spoke gateways $122_1$-$122_4$, the transit gateways $142_1$-$142_2$ and the controller 150. This routing table 172 is relied upon by the native cloud gateway 170 to support communications over the management network 114 using private IP addresses in the transmission of one or more messages over the management network 114.

More specifically, through use of the routing table 172, the native cloud gateway 170 is able to support communications, such as the transmission of management information, between different spoke VPCs, such as spoke VPC $120_1$ and spoke VPC $120_2$ within the same geographic region. Additionally, the native cloud gateway 170 is able to support communications with or between remotely located spoke VPCs in different geographic regions based, at least in part, on communications with another native cloud gateway (not shown) maintaining private IP addressing associated with spoke gateways within remotely located spoke VPCs. Also, these routing tables 172 may be relied upon by the native cloud gateway 170 to support the communication of management information to any of the transit gateways $142_1$-$142_2$.

Hence, each of the spoke gateways $122_1$-$122_4$ deployed within the spoke VPCs $120_1$-$120_2$, each of the transit gateways $142_1$-$142_2$ deployed within the transit VPC $140_1$ may be accessed within the routing tables in accordance with a unique Classless Inter-Domain Routing (CIDR) private IP addresses to propagate messages over the management network 114.

III. Operational Flow—Building Management Network

Figure 2:
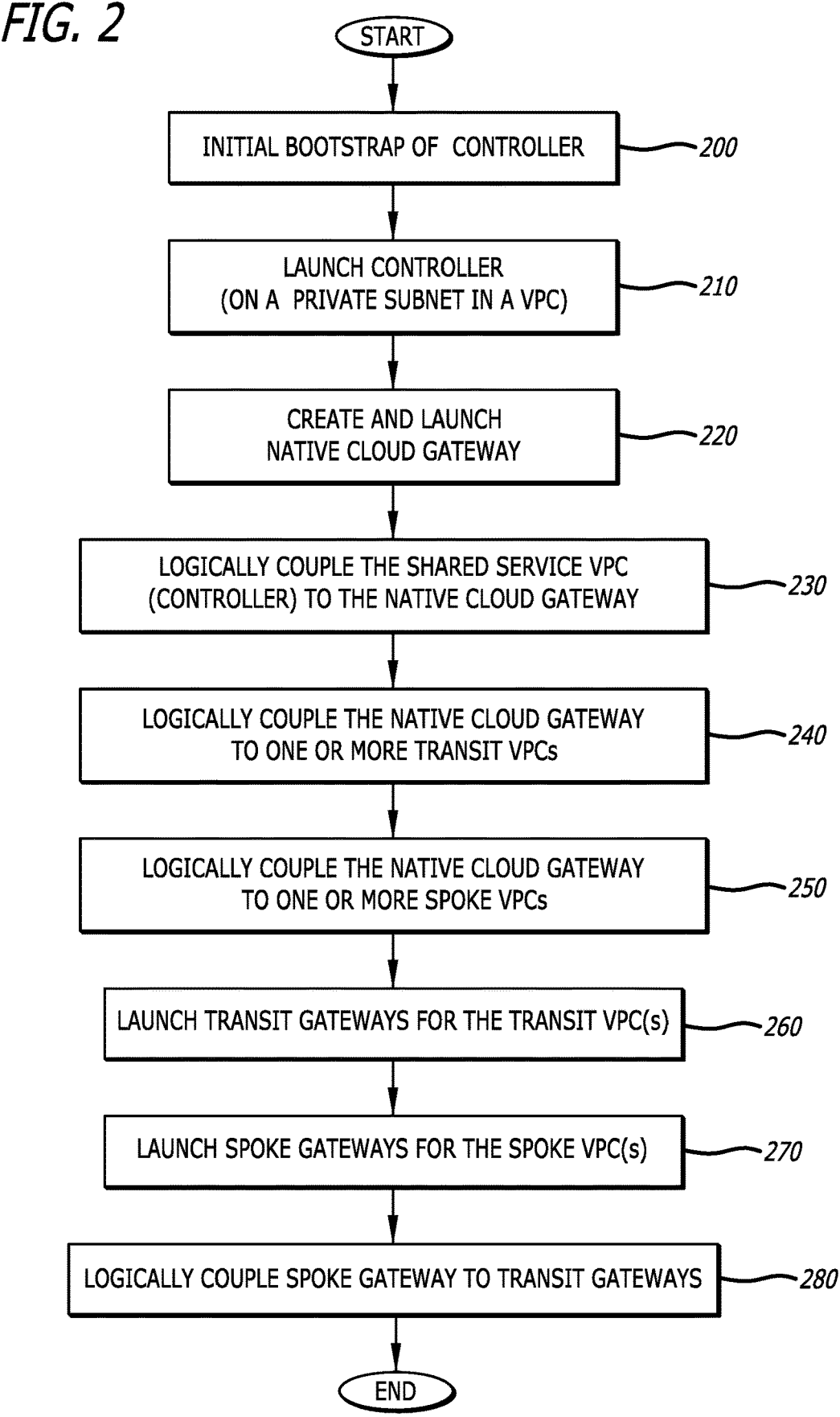
FIG. 2 is an illustrative embodiment of a method of operation for deployment of the management network of FIG. 1.

Referring now to FIG. 2, an illustrative embodiment of a method of operation for deployment of the management network 114 is shown, where references to components of the cloud network 110 are illustrated in FIG. 1. Herein, an initial bootstrap of the controller 150, namely a software instance operating as part of the cloud network 110, is conducted (block 200). More specifically, the communication link 195 is established between a virtual private network (VPN) termination point, being a native construct provided as part of the cloud network 110 and included as part of the shared resource VPC 165, and the on-premises network 190. Given that Secure HTTP (HTTPS) communication may be required by a network administrator of the on-premises network 190 to access the controller 150 and the controller 150 is to be launched with its private IP address, the communication link 195 (e.g., an IPSec virtual private network (VPN) connection) is needed so that the computing devices 180 operating as part of the on-premises network 190 are able to access the controller 150 via its private IP address.

After the initial bootstrap operation and establishment of the communication link 195, the controller 150 is launched on a private subnet in a virtual private cloud (VPC) referred to as the shared service VPC 165 (block 210). Stated differently, the controller 150, being a software instance, is activated and accessible via a private IP address to assist in formulating the management network 114 of FIG. 1.

Figure 3:
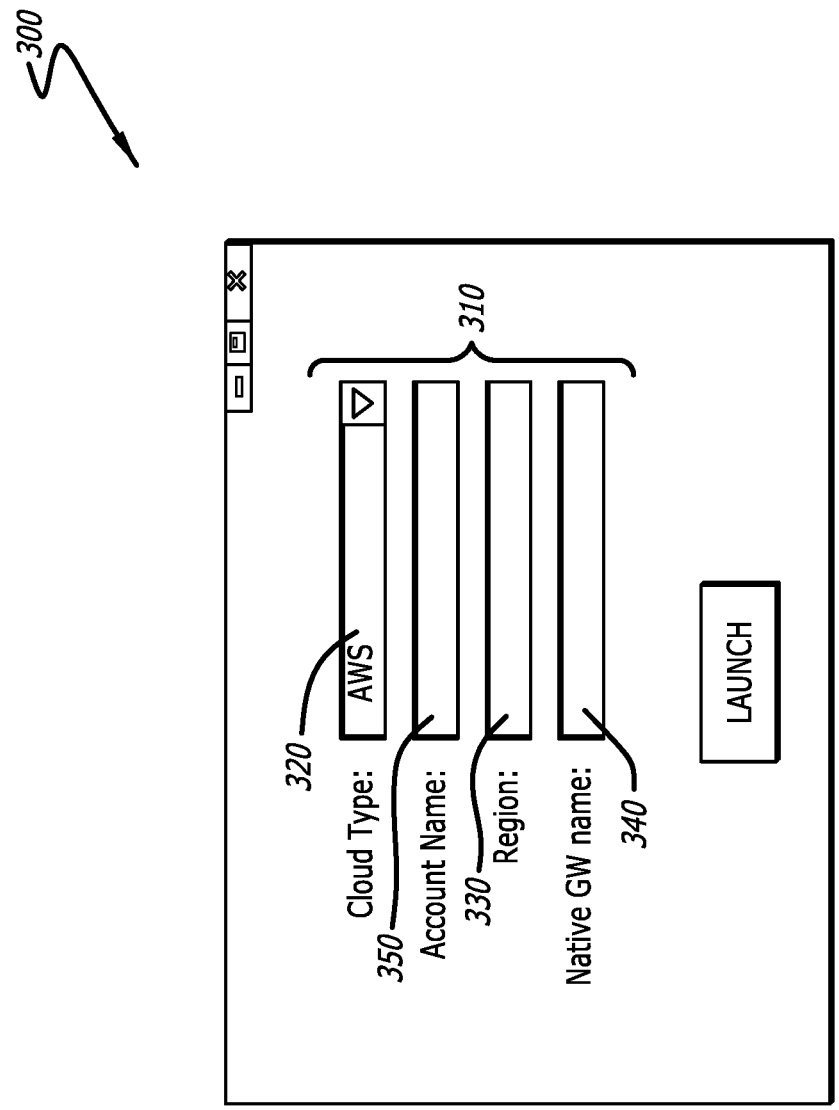
FIG. 3 is an exemplary embodiment of a window or dialog box for creation of the native cloud gateway of FIG. 1.

From the controller 150, the native cloud gateway 170 is created and launched (block 220). Such creation of the native cloud gateway 170 may be conducted by the controller generating a displayable element 300 such as a window or dialog box 300 as shown in FIG. 3. The displayable element 300 includes a plurality of entry fields 310, including a first entry field 320 that allows for a network administrator to identify the particular cloud network (e.g., AWS) along with a second entry field 330 that allows the network administrator to identify the particular region within the cloud network (AWS) into which the native cloud gateway 170 is to be created and launched. The displayable element 300 further includes a third entry field 340, which provides selection for an identifier (e.g. name) assigned to the native cloud gateway 170. During creation, the controller 150 further populates routing tables utilized by the native cloud gateway 170. The account name 350 may be additionally provided to assign the native cloud gateway 170 to support operability of certain VPCs associated with the account owner and to determine allocation of costs associated with infrastructure provided by the cloud network provider.

Returning back to FIGS. 1-2, after creation and launching of the native cloud gateway 170, communication links forming the management network 114 may be established. In particular, a shared service VPC 165 inclusive of the controller 150 is logically coupled to the native cloud gateway 170 via a first communication link such as a first logical interconnect 290 shown in FIG. 1 (block 230). Through the logical coupling and storage within the routing table 172, the native cloud gateway 170 has visibility as to the CIDR private IP address of the controller 150. Similarly, based on usage of a console of the controller 150 or via Application Programming Interface (API), one or more transit VPCs (e.g., transit VPC 140) may be logically coupled to the native cloud gateway 170 via a second communication link such as a second logical interconnect 292 shown in FIG. 1 (block 240), and as a result, the native cloud gateway 170 has visibility as to the CIDR private IP address of each transit gateway $142_1$-$142_2$ within the transit VPCs (e.g., transit VPC 140). Herein, the logical coupling to the transit VPCs may be directed to only one or more transit VPCs that are configured to receive management information from the controller 150 via the native cloud gateway 170.

Lastly, given that the logical interconnect 290 is established between the native cloud gateway 170 and the shared service VPC 165 including the controller 150, the spoke VPCs (e.g., spoke VPCs $120_1$-$120_2$) are logically coupled to the native cloud gateway 170 via respective communication links such as a third logical interconnect 294 and a fourth logical interconnect 296 of FIG. 1. As a result, the native cloud gateway 170 has visibility as to the CIDR private IP address of each spoke gateway $122_1$-$122_4$ within the spoke VPCs $120_1$-$120_2$, and with the CIDR private IP addresses for other components of the cloud network 110 to enable communications over the management network 114 (block 250). Further discussion of the operations by a spoke gateway (e.g., spoke gateway $122_1$) in logically coupling to the native cloud gateway 170 are described below and illustrated in FIG. 4.

After the management network 114 has been established, the data network 112 is established. In particular, from the console of the controller 150 or via API, each transit gateway (e.g., transit gateways $142_1$-$142_2$) on a private subnet in the transit VPC 140 is launched (block 260). Thereafter, software directed to each of the transit gateways $142_1$-$142_2$ may be uploaded from the controller 150 through the management network 114 via the native cloud gateway 170 such as via logical interconnects 290 and 292 of FIG. 1.

Once the transit gateways $142_1$-$142_2$ are launched, from the console of the controller 150 or via API, each spoke gateways $122_1$-$122_4$ associated with the spoke VPCs $120_1$-$120_2$ may be launched (block 270). Thereafter, each of the spoke gateways $122_1$-$122_4$ may be logically coupled to the transit gateways $142_1$-$142_2$ (block 280). For example, the first spoke gateway $122_1$ may be logically coupled to the first transit gateway $142_1$ via communication links $155_1$-$155_2$ while the second spoke gateway $122_2$ may be logically coupled to the second transit gateway $142_2$ via communication links $155_3$-$155_4$. Similarly, the third spoke gateway 1223 may be logically coupled to the first transit gateway $142_1$ via communication links $155_5$-$155_6$ while the fourth spoke gateway $122_4$ may be logically coupled to the second transit gateway $142_2$ via communication links $155_7$-$155_8$. Collectively, the communications links $155_1$-$155_8$ between the spoke VPCs $120_1$-$120_N$ and the one or more transit VPCs (e.g., transit VPC 140) form the data network 112.

Figure 4:
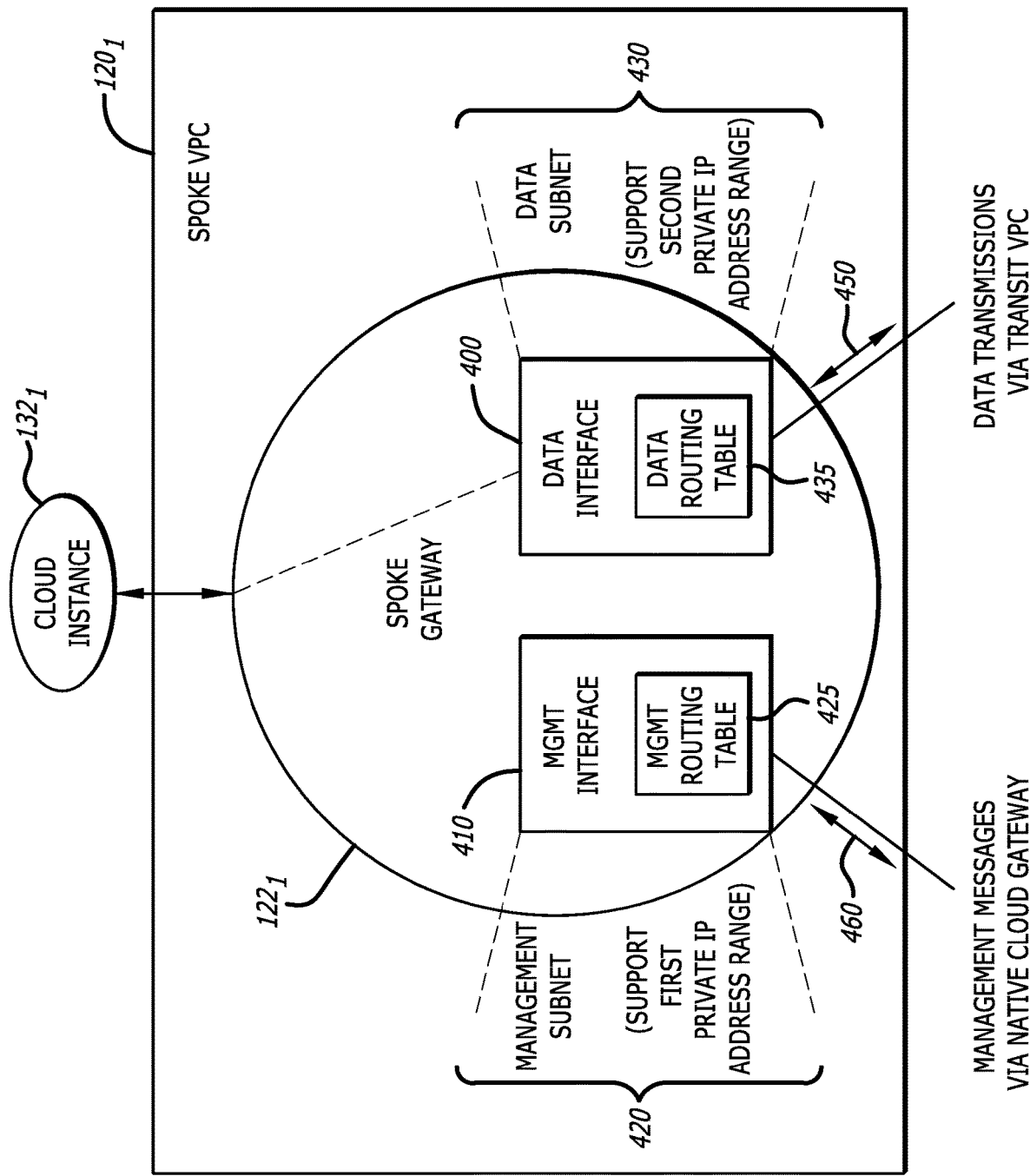
FIG. 4 is an exemplary illustration of a logical representation of one of the spoke gateway deployed within the spoke VPC of FIG. 1.

Referring now to FIG. 4, an exemplary illustration of a logical representation of one of the spoke gateway $122_1$ deployed within the spoke VPC $120_1$ of FIG. 1 is shown. Conventionally, the spoke gateway $122_1$ was configured with a single interface 400 associated with an assigned public IP address to which data transmissions and management information are directed. According to one embodiment of the disclosure, the spoke gateway $122_1$ is configured with dual, front-facing interfaces, namely a data interface (ETHO) 400 adapted for receiving/sending data transmissions over a communication link (e.g., link $155_1$) from/to the transit VPC 140 and a management interface (MGMT) 410 adapted for receiving/sending management information from/to the controller 150 via the native cloud gateway 170.

More specifically, the management interface 410 is associated with a dedicated, management subnet 420 (e.g., a private IP address or a range private IP addresses providing access to the spoke gateway $122_1$) along with a specific (management) routing table 425 associated with the management subnet 420. Herein, according to one embodiment, the management routing table 425 constitutes a portion of the VPC routing table 162 (see FIG. 1) for the spoke gateway $122_1$. As a result, when prompted to logically couple to the native cloud gateway 170, the spoke gateway $122_1$ provides, via the management interface 410, the management subnet 420 along with the management routing table 425 to the controller 150 via the native cloud gateway 170.

Besides logically coupling to the native cloud gateway 170, as further shown in FIG. 4, the spoke gateway $122_1$ is configured to logically couple to one or more transit gateways of the transit VPC 140 (e.g., transit gateway 142₁). In particular, the data interface 400 is associated with a subnet 430 dedicated to that data interface 400 (e.g., a public IP address or a range of public IP addresses providing access to the spoke gateway 122₁ via the data interface 400) along with a routing table 435 pertaining to the data subnet 430. The data routing table 435 may include IP addresses associated with communication links established via the data interface 400 (e.g., addressing information associated with communication links 155₁-155₂) and, according to one embodiment, may constitute a portion of the VPC routing table 162 (see FIG. 1) for the spoke gateway 122₁.

As a result of this configuration, data traffic 450 from one of the cloud instances associated with the spoke gateway 122₁ (e.g., cloud instance 132₁ operating as an EC2 instance) is routed as messages through the data interface 400 while management information 460 (e.g., Hello messages, Keep-Alive messages, etc.) generated by the spoke gateway 122₁ are routed through the management interface 410. Hence, for outbound traffic, the data interface 400 is selected by route control logic 440 (e.g., a virtual processor, a route control instance, etc.) within the spoke gateway 122₁ if the traffic is being forwarded from any of the cloud instances (e.g. cloud instance 132₁) supported by the spoke gateway 120₁ while the management interface 410 is selected by the route control logic 440 within the spoke gateway 122₁ if the traffic is initiated by the spoke gateway 122₁. Similarly, the management interface 410 is utilized for communications from the controller 150 (via native cloud gateway 170) of FIG. 1 while the data interface 400 is utilized for communications from the transit VPC 140 of FIG. 1.

IV. General Architecture—Second Embodiment

Figure 5:
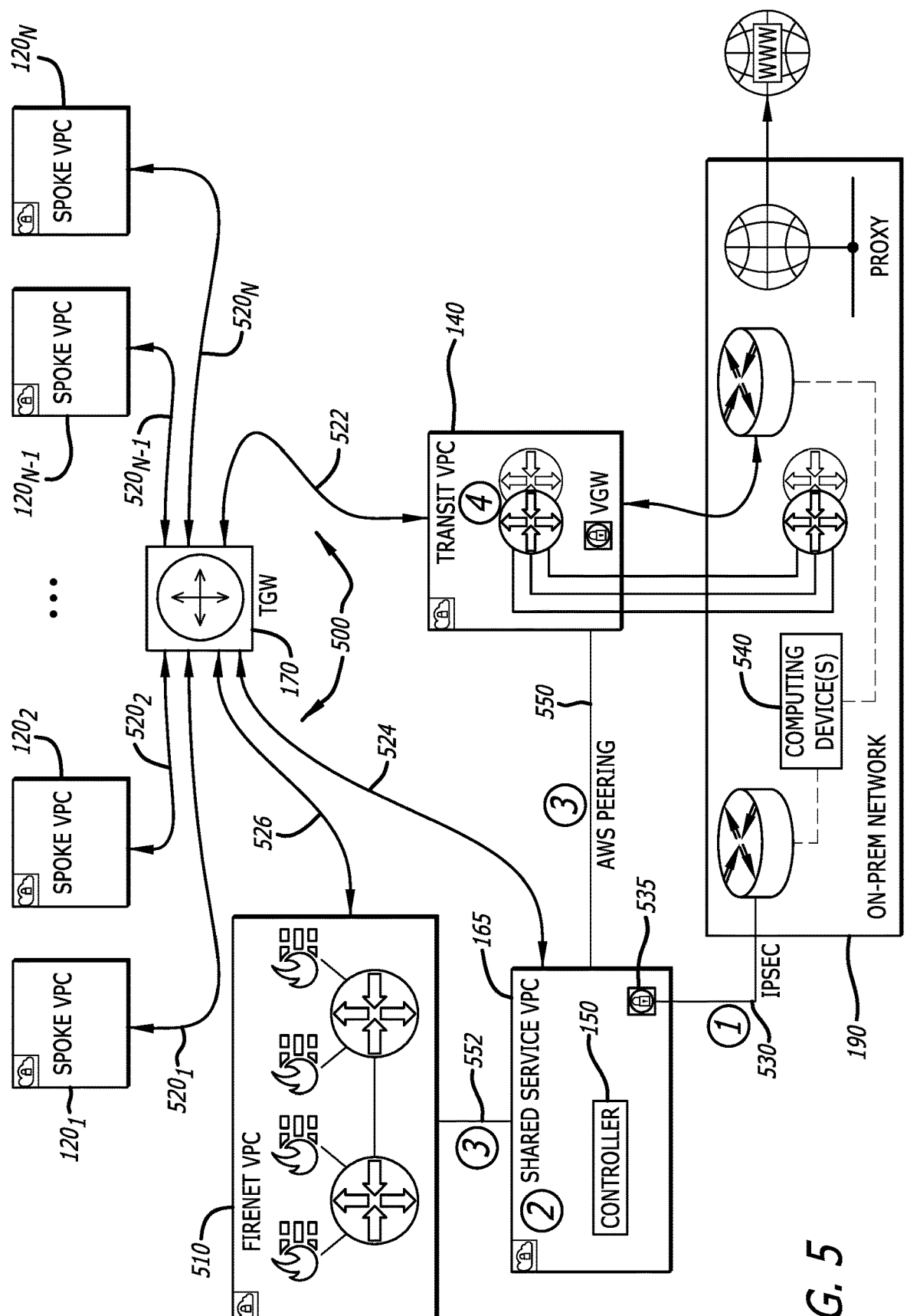
FIG. 5 is an exemplary embodiment of the public cloud computing platform of FIG. 1, including a peer-to-peer management network.

Referring now to FIG. 5, an exemplary embodiment of the public cloud computing platform 100 of FIG. 1 deploying a peer-to-peer management network 500 is shown. Herein, the public cloud computing platform 100 features one or more spoke VPCs 120₁-120ₙ, at least one transit VPC 140, the shared service VPC 165, a FireNet VPC 510 as described in U.S. patent application Ser. No. 17/216,596 entitled "Systems and Method For Firewall Deployment in a Cloud Computing Environment," and the native cloud gateway 170. The native cloud gateway 170 establishes (i) communication links 5201-520N with each of the spoke VPCs 120₁-120ₙ, (ii) a communication link 522 with the transit VPC 140, (iii) a communication link 524 with the shared service VPC 165, and (iv) a communication link 526 with the FireNet VPC 510.

Herein, as described above, a communication link 530 is established between a virtual private network (VPN) termination point 535, being a native construct provided as part of the cloud network 110 and included as part of the shared resource VPC 165, and the on-premises network 190 (operation 1). To provide secure communications, an IPSec virtual private network (VPN) connection may be established so that computing devices 540 operating as part of the on-premises network 190 are able to access the controller 150 via its private IP address.

After the communication link 530 has been established, the controller 150 is launched on a private subnet in the shared service VPC 165 (operation 2). Stated differently, the controller 150, being a software instance, is activated and accessible via a private IP address to assist in formulating the peer-to-peer management network 500. Thereafter, the controller 150 may be configured to create data links 550/552 to establish peer-to-peer connectivity between the controller 150 and the transit VPC 140/FireNet VPC 510, respectively (operation 3). Thereafter, each transit gateway 142₁-142₂ is launched on a private subset and is now operational (operation 4).

While the cloud network 110 may rely on private IP addresses for connectivity between components, Internet access for each of the spoke gateway 122₁-122₂ and transit gateways 142₁-142₂ is maintained and leveraged through connectivity via the native cloud gateway 170.

V. General Architecture—Third Embodiment

Figure 6:
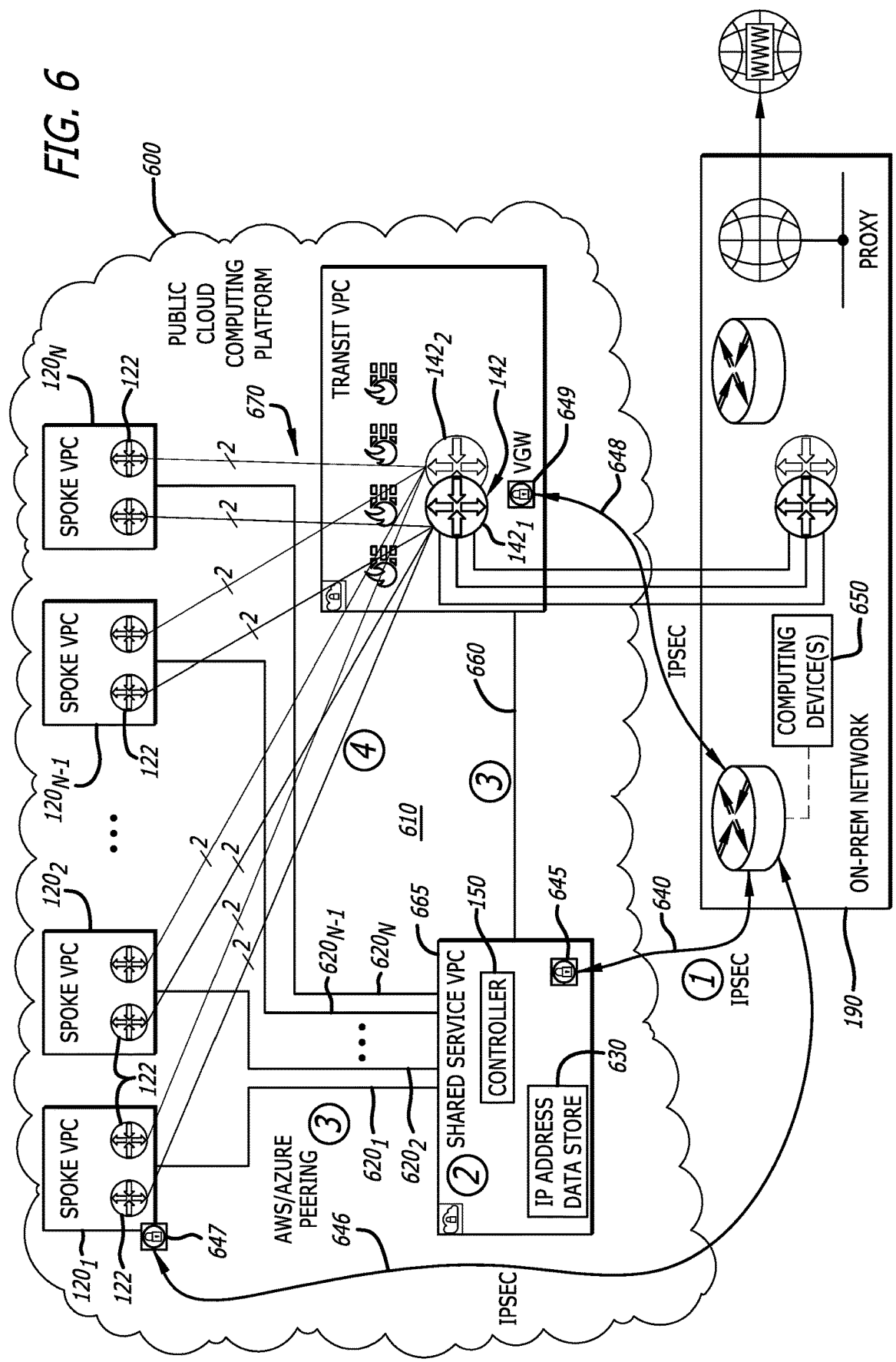
FIG. 6 is a third exemplary embodiment of the public cloud computing platform of FIG. 1 being an Azure®-based public cloud computing platform with a management network.

Referring now to FIG. 6, an exemplary embodiment of a peer-to-peer management network 610 deployed as part of an Azure®-based public cloud computing platform 600 is shown. Herein, the public cloud computing platform 600 features the shared service VPC 165, including the controller 150, which is configured to support peer-to-peer communication links 620₁-620ₙ for each of the spoke VPCs 120₁-120ₙ in lieu of reliance of the native cloud gateway 170. Herein, the controller 150 maintains and manages a Private IP address data store 630 for each of the spoke gateways 122 residing within the spoke VPCs 120₁-120ₙ and for each transit gateway 142 residing within the at least one transit VPC 140.

Herein, as described above, a communication link 640 is established between a virtual private network (VPN) termination point 645, being a native construct provided as part of the public cloud computing platform 600 and included as part of the shared resource VPC 165, and the on-premises network 190 (operation 1). As described above, to provide secure communications, an IPSec virtual private network (VPN) connection may be established so that computing devices 650 operating as part of the on-premises network 190 are able to access the controller 150 via its private IP address. Additionally, communication links 646 and 648 may be established between virtual VPN termination points 647 and 649 of one or more selected spoke VPCs (e.g., VPC spoke 120₁) and transit VPC 140, respectively.

After the communication link 640 (and/or links 646/648) have been established, the controller 150 is launched on a private subnet in the shared service VPC 165 (operation 2). As previously described, the controller 150, being a software instance, is activated and accessible via a private IP address to assist in formulating the peer-to-peer management network 610. Thereafter, the controller 150 may be configured to create the communication links 620₁-620ₙ to establish peer-to-peer connectivity between the controller 150 and the spoke VPCs 120₁-120ₙ along with at least a communication link 660 between the controller 150 and the transit VPC 140 (operation 3). Thereafter, each of the spoke gateways 122 and transit gateways 142₁-142₂ are launched on a private subset and are now operational. Based on the launch of the transit gateways 142₁-142₂, data communication links 670 are established as a mesh network where each spoke gateways 122 is communicatively coupled to each transit gateways 142₁-142₂ (operation 4).

VI. General Architecture—Fourth Embodiment (Multi-Cloud)

Figure 7:
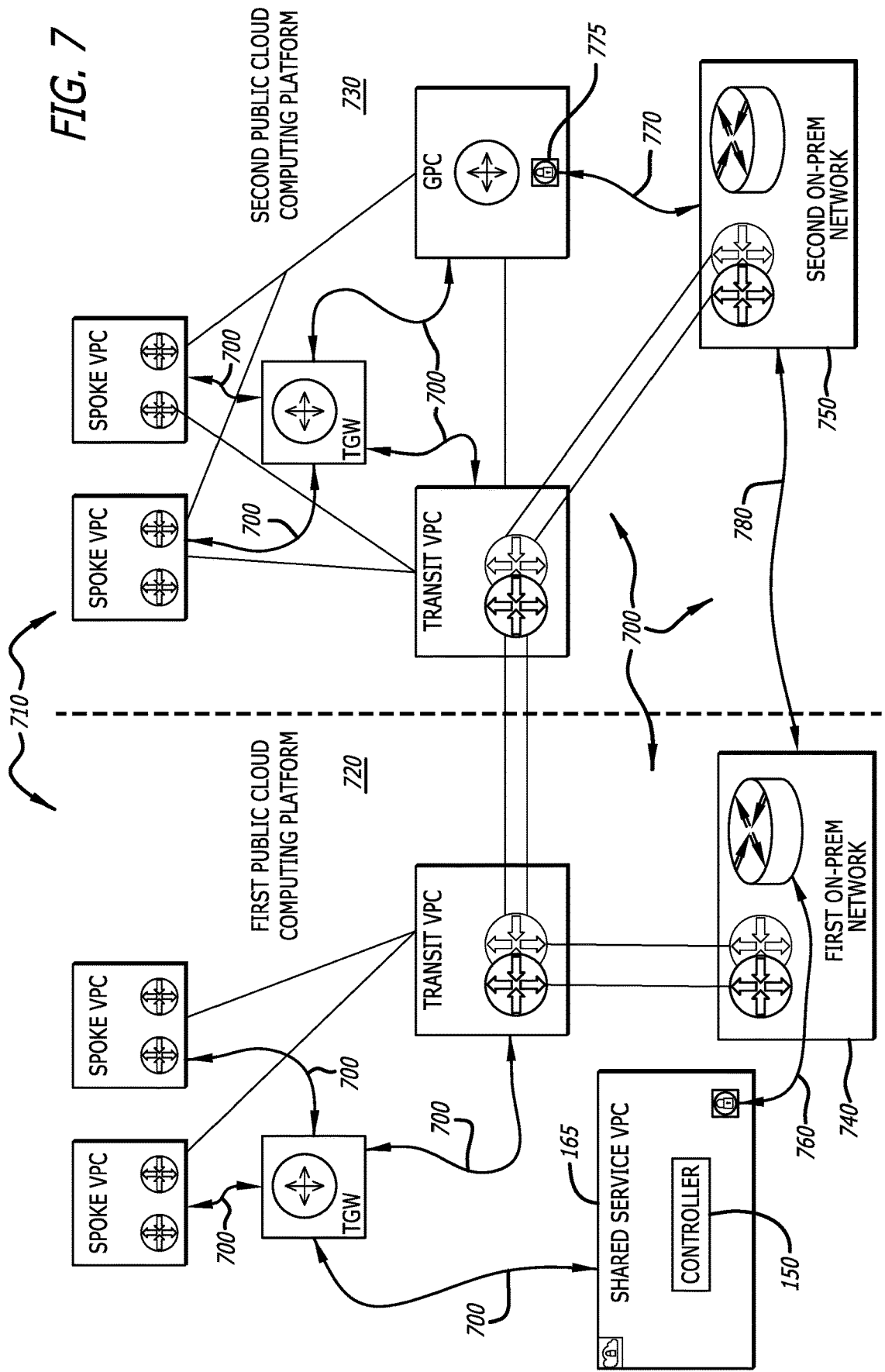
FIG. 7 is an exemplary embodiment of the management network to support a multi-cloud network.

Referring now to FIG. 7, an exemplary embodiment of a management network 700 to support a multi-cloud network 710 utilized by an enterprise is shown. Herein, the multi-cloud network 710 includes a first public cloud computing platform 720 serviced by a first cloud provider (e.g., AWS public cloud) and a second public cloud computing platform 730 (e.g., Google Cloud Platform "GPC") serviced by a second cloud provider. Herein, the formulation of the management network associated with the first public cloud computing platform 720 is similar as described above. One distinction associated with a multi-cloud management network is centered around the connectivity between the controller 150 of the shared services VPC 165 operating as part of the first public cloud computing platform 720 and gateways associated with the second public cloud computing platform 730.

According to one embodiment of the disclosure, the connectivity is established via the on-premises networks 740 and 750, where a communication link 760 is established between a VPN termination point 745, being a native construct provided as part of the first public cloud computing platform 720 and included as part of the shared resource VPC 165, and the on-premises network 740. Similarly, a communication link 770 is established between a VPN termination point 775, being a native construct provided as part of the second public cloud computing platform (GPC) and the on-premises network 750. Based on established connectivity between the on-premises networks 740 and 750, as represented by communication links 780, the controller 150 may be able to support private IP address management across multiple (and different) cloud platforms.

Embodiments of the invention may be embodied in other specific forms without departing from the spirit of the present disclosure. The described embodiments are to be considered in all respects only as illustrative, not restrictive.

What is claimed is:

1. A gateway, comprising:
    a processor;
    a non-transitory storage medium including routing control logic, a management interface and a data interface, wherein the routing control logic is configured to (i) direct a first type of outbound traffic via the data interface when the first type of outbound traffic is being forwarded from a cloud instance supported by the gateway and (ii) direct a second type of outbound traffic via the management interface when the second type of outbound traffic is initiated by logic within the gateway; and
    wherein the gateway is configured to generate one or more routing tables for each spoke gateway within a spoke VPC of the cloud instance, each routing table of the one or more routing tables being based on private Internet Protocol (IP) addresses and comprising routing information associated with its respective spoke gateway and routing information associated with communication links between spoke gateway and any cloud instances associated with a particular instance subnet supported by that spoke gateway, and wherein the routing table is relied upon by the gateway to support communications over a management network using the private IP addresses in transmission of one or more messages over the management network.

2. The gateway of claim 1, wherein the management interface and the data interface are dual, front-facing interfaces configured to send and receive messages over one or more communication links.

3. The gateway of claim 1, wherein the management interface is configured to receive the second type of outbound traffic corresponding to management information from or send the management information to a native cloud gateway operating as a hub for the management network utilizing a private addressing for distribution of the management information.

4. The gateway of claim 3, wherein the private addressing allows for an exchange of the management information through the private Internet Protocol (IP) addresses assigned to each gateway and cloud instance operating as part of a public cloud network including the gateway.

5. The gateway of claim 3, being communicatively coupled to a controller via the native cloud gateway to receive management information including routing information maintained within a management routing table that identifies permitted routing via the management interface.

6. The gateway of claim 1, wherein the second type of outbound traffic corresponds to management information includes a Hello message or a Keep-Alive message.

7. The gateway of claim 3, wherein the data interface is configured to receive the first type of outbound traffic corresponding to one or more data messages from a transit gateway or send the first type of outbound traffic corresponding to data messages to a cloud instance based on different private addresses associated with the private addressing that are assigned to the gateway, the transit gateway and the cloud instance.

8. A cloud computing platform for supporting communications between components within virtual private cloud networks using private addresses, comprising:
    a processor;
    software that, upon execution by the processor, comprises
        (i) a controller, and
        (ii) a plurality of spoke virtual private cloud networks communicatively coupled to the controller, each of the spoke virtual private cloud networks include one or more spoke gateways, wherein a first spoke gateway of a first spoke virtual private cloud network of the plurality of spoke virtual private networks is configured to (i) route management information addressed with a private Internet Protocol (IP) address associated with a second spoke gateway of a second spoke virtual private cloud network via one or more native cloud gateways and (ii) receive management information from the controller for routing the management information to one or more cloud instances each addressed by a different private IP address; and
    wherein the cloud computing platform is configured to generate one or more routing tables for each spoke gateway within a spoke VPC of the cloud instance, each routing table of the one or more routing tables being based on private Internet Protocol (IP) addresses and comprising routing information associated with its respective spoke gateway and routing information associated with communication links between spoke gateway and any cloud instances associated with a particular instance subnet supported by that spoke gateway, and wherein the routing table is relied upon by the cloud computing platform to support communications over a management network using the private IP addresses in transmission of one or more messages over the management network.

9. The cloud computing platform of claim 8 operating as a multi-cloud computing platform with the first spoke virtual private cloud network being deployed within a first public cloud network and a second virtual private cloud network being deployed within a second public cloud network that is different from the first public cloud network.

10. The cloud computing platform of claim 9, wherein the one or more native cloud gateways include a native cloud gateway for the first public cloud network communicatively coupled to a native cloud gateway for the second public cloud network.

11. The cloud computing platform of claim 8, wherein the first spoke gateway includes (i) a data interface for a first type of outbound traffic when the first type of outbound traffic is being forwarded from a cloud instance supported by the first spoke gateway and (ii) a management interface for a second type of outbound traffic when the second type of outbound traffic is initiated by logic within the first spoke gateway.

12. The cloud computing platform of claim 11, wherein the management interface and the data interface are dual, front-facing interfaces for the first spoke gateway that are configured to send and receive messages over one or more communication links.

13. The cloud computing platform of claim 11, wherein the management interface of the first spoke gateway is configured to (i) receive the second type of outbound traffic corresponding to the management information from or (ii) send the management information to a native cloud gateway of the one or more native cloud gateways operating as a hub for the management network utilizing a private IP addressing for distribution of the management information.

14. The cloud computing platform of claim 13, wherein the private IP addressing allows for an exchange of the management information using private IP addresses assigned to each spoke gateway of the one or more spoke gateways and each cloud instance of the one or more cloud instances operating at least as part of the first public cloud network including the first spoke gateway.

15. The cloud computing platform of claim 13, wherein the first spoke gateway is communicatively coupled to the controller via a native cloud gateway to receive management information including routing information maintained within a management routing table that identifies permitted routing via the management interface.

16. The cloud computing platform of claim 11, wherein the second type of outbound traffic corresponds to management information includes a Hello message or a Keep-Alive message.

17. The cloud computing platform of claim 11, wherein the data interface of the first spoke gateway is configured to receive the first type of outbound traffic corresponding to one or more data messages from a first transit gateway being communicatively coupled to a second transit gateway that is configured to communicate with the second spoke gateway of the second spoke virtual private cloud network or send the first type of outbound traffic corresponding to data messages to a cloud instance of the one or more cloud instances based on different private IP addresses associated with the private IP addressing that are assigned to the first spoke gateway, the first transit gateway, the second transit gateway, and the cloud instance.

18. A computerized method of routing management information utilizing private addresses via a gateway, the method comprising:
generating one or more routing tables for each spoke gateway within a spoke VPC of the cloud instance, each routing table of the one or more routing tables being based on private Internet Protocol (IP) addresses and comprising routing information associated with its respective spoke gateway and routing information associated with communication links between spoke gateway and any cloud instances associated with a particular instance subnet supported by that spoke gateway, and wherein the routing table is relied upon by the gateway to support communications over a management network using the private IP addresses in transmission of one or more messages over the management network;
determining whether outbound traffic corresponds to a first type of outbound traffic being forwarded from the cloud instance supported by the gateway;
responsive to determining that the first type of outbound traffic is being forwarded from the cloud instance, directing the first type of outbound traffic via a data interface of the gateway;
determining whether the outbound traffic corresponds to a second type of outbound traffic being initiated by logic within the gateway; and
responsive to determining that the second type of outbound traffic is being initiated by logic within the gateway, directing the second type of outbound traffic via a management interface of the gateway.

19. The computerized method of claim 18, wherein the management interface and the data interface of the gateway are dual, front-facing interfaces configured to send and receive messages over one or more communication links.

20. The computerized method of claim 18, wherein the directing of the second type of outbound traffic via the management interface comprises sending the second type of outbound traffic corresponding to a native cloud gateway operating as a hub for the management network of a public cloud network and utilizing private addressing for distribution of the second type of outbound traffic.

21. The computerized method of claim 20, wherein the private addressing allows for an exchange of the second type of outbound traffic through a private Internet Protocol (IP) address assigned to a second gateway operating as part of a public cloud network including the gateway.

22. The computerized method of claim 21, wherein the second type of outbound traffic includes a Hello message or a Keep-Alive message.

\* \* \* \* \*